(12) United States Patent  (10) Patent No.: US 7,907,360 B2
Mak et al.  (45) Date of Patent: Mar. 15, 2011

(54) SETTING WRITER BOUNDARIES FOR MULTIPLE WRITERS

(75) Inventors: Hon Yeong Mak, Singapore (SG); Lin Nah Lim, Singapore (SG); Det Hau Wu, Singapore (SG); Edmun Chia Song Seng, Singapore (SG); UttHeng Kan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 232 days.

(21) Appl. No.: 12/172,526

(22) Filed: Jul. 14, 2008

(65) Prior Publication Data

US 2010/0007986 A1   Jan. 14, 2010

(51) Int. Cl.
    G11B 27/36   (2006.01)
(52) U.S. Cl. ............................ 360/31; 360/60; 360/76
(58) Field of Classification Search .................. None
    See application file for complete search history.

(56) References Cited

U.S. PATENT DOCUMENTS

| | | | |
|---|---|---|---|
| 4,799,115 A | 1/1989 | Rogers et al. | |
| 5,254,946 A | 10/1993 | Guzik | |
| 5,790,341 A | 8/1998 | Cunningham et al. | |
| 6,504,675 B1 | 1/2003 | Shukh et al. | |
| 6,710,973 B2 | 3/2004 | Takano et al. | |
| 6,813,116 B2 | 11/2004 | Nakamura et al. | |
| 6,891,697 B2 | 5/2005 | Nakamura et al. | |
| 6,954,340 B2 | 10/2005 | Shukh et al. | |
| 6,969,989 B1 | 11/2005 | Mei | |
| 6,995,949 B2 | 2/2006 | Nakamura et al. | |
| 7,193,807 B1 | 3/2007 | Liikanen et al. | |
| 7,508,619 B2 * | 3/2009 | Okamoto et al. | 360/76 |
| 7,688,540 B1 * | 3/2010 | Mei et al. | 360/76 |
| 2006/0018051 A9 | 1/2006 | Chiao et al. | |
| 2006/0152850 A1 | 7/2006 | Hsu et al. | |
| 2007/0188921 A1 | 8/2007 | Mochizuki et al. | |
| 2007/0211382 A1 | 9/2007 | Mochizuki et al. | |
| 2007/0253107 A1 | 11/2007 | Mochizuki et al. | |
| 2008/0002277 A1 | 1/2008 | Sacks et al. | |
| 2008/0002280 A1 | 1/2008 | Asakura | |
| 2008/0084636 A1 | 4/2008 | Oh et al. | |
| 2008/0231985 A1 * | 9/2008 | Okamoto | 360/75 |

* cited by examiner

*Primary Examiner* — Jason C Olson
(74) *Attorney, Agent, or Firm* — Brian R. Morrison; Westman, Champlin & Kelly, P.A.

(57) ABSTRACT

A storage medium having a boundary located along a surface of the storage medium that functions as a transition point for selectively operating a first writer and a second writer of a plurality of writers, where the location of the boundary is set based on writing capabilities of the plurality of writers.

17 Claims, 8 Drawing Sheets

SETTING WRITER BOUNDARIES FOR MULTIPLE WRITERS

BACKGROUND

The present disclosure relates to data storage devices. In particular, the present disclosure relates to techniques for setting load distributions on storage media using multiple writers.

Data storage devices, such as disc drives, typically store information on surfaces of storage media, such as magnetic or optical discs. In a typical disc drive, one or more discs are mounted together on a spindle motor. The spindle causes the disc(s) to spin and the data surfaces of the disc(s) to pass under respective bearing sliders. A transducing head carried by a slider is used to read from and write to a data track on a disc. The slider is typically carried by a head arm assembly that includes an actuator arm and a suspension assembly, which can include a separate gimbal structure or can integrally form a gimbal. During operation, as the disc spins, the slider glides above the surface of the disc on a small cushion of air, and the actuator arm pivots to movably position the slider with respect to the disc.

The transducing head typically includes a writer and a reader. The reader includes a sensor for retrieving magnetically encoded information stored on the disc (or other magnetic storage media). Magnetic flux from the surface of the disc causes rotation of the magnetization vector of a sensing layer or layers of the sensor, which in turn causes a change in the electrical properties of the sensor that can be detected by passing a current through the sensor and measuring a voltage across the sensor. Depending on the geometry of the sensor, the sensed current may be passed in the plane (CIP) of the layers of the sensor or perpendicular to the plane (CPP) of the layers of the sensor. External circuitry then converts the voltage information into an appropriate format and manipulates that information as necessary to recover information encoded on the disc.

The writer, for a perpendicular recording transducing head, typically includes a main pole and a return pole, which are separated from each other at an air bearing surface (ABS) of the transducing head by a gap layer. The main pole and return pole are connected to each other at a region distal from the ABS by a back gap closer or back via. One or more layers of conductive coils are typically positioned between the main and return poles, and are encapsulated by insulating layers. The conductive coils can have different configurations, such as helical and pancake configurations. To write data to the disc (or other magnetic media), an electric current is applied to the conductive coils to induce a magnetic field in the disc under a pole tip of the main pole. By reversing the direction of the current through the coils, the polarity of the data written to the magnetic media is reversed, and a magnetic transition is written between two adjacent bits. Because the main pole is generally the trailing pole of the main and return poles, the main pole is typically used to write the data to the magnetic media.

As areal recording densities for storage discs increase, the sizes of sliders and transducing heads continue to decrease. Moreover, the track widths of individual concentric data tracks on the storage discs continue to decrease. Decreasing slider sizes and disc track widths present numerous difficulties. For example, with perpendicular recording heads, magnetization transitions are recorded on the magnetic medium (e.g., disc) by a trailing edge of the main pole. The shape of the pole tip of the main pole is projected and reproduced on the magnetic medium during the write process. However, unwanted overwriting or side writing at locations adjacent to a desired write location on a data track may occur due to changes in the skew angle as the transducing head travels in an arc across the magnetic medium as the actuator arm and suspension pivot. Skew angles are typically most prominent at the inner and outer diameter regions of the disc. This can cause adjacent track interference, resulting in off track erasure of transitions recorded on the magnetic medium, and ultimately leading to a degradation of bit error rate. Accordingly, there is an ongoing need to attain high areal densities on recording media to meet the increased demand for high capacity data storage devices.

SUMMARY

An aspect of the disclosure is directed to a method that includes determining a location along a storage medium surface based on writing capabilities of a plurality of writers, and setting a boundary at the determined location along the storage medium surface, where the boundary functions as a transition point for selectively operating a first writer and a second writer of the plurality of writers.

Another aspect of the disclosure is directed to a method that includes performing at least one measurement operation between a storage medium and a plurality of writers to identify writing capabilities, and setting a boundary at a location along a surface of the storage medium based on the identified data writing capabilities. The boundary divides data zones of the storage medium into at least a first data zone group writable with a first writer of the plurality of writers and a second data zone group writable with a second writer of the plurality of writers.

A further aspect of the disclosure is directed to a data storage device that includes a storage medium having a surface comprising a plurality of data zones, and a boundary located along a radius of the surface, where the boundary divides the plurality of data zones into at least a first data zone group and a second data zone group, and functions as a transition point to selectively operate separate writers of a transducing head.

DETAILED DESCRIPTION

Figure 1:
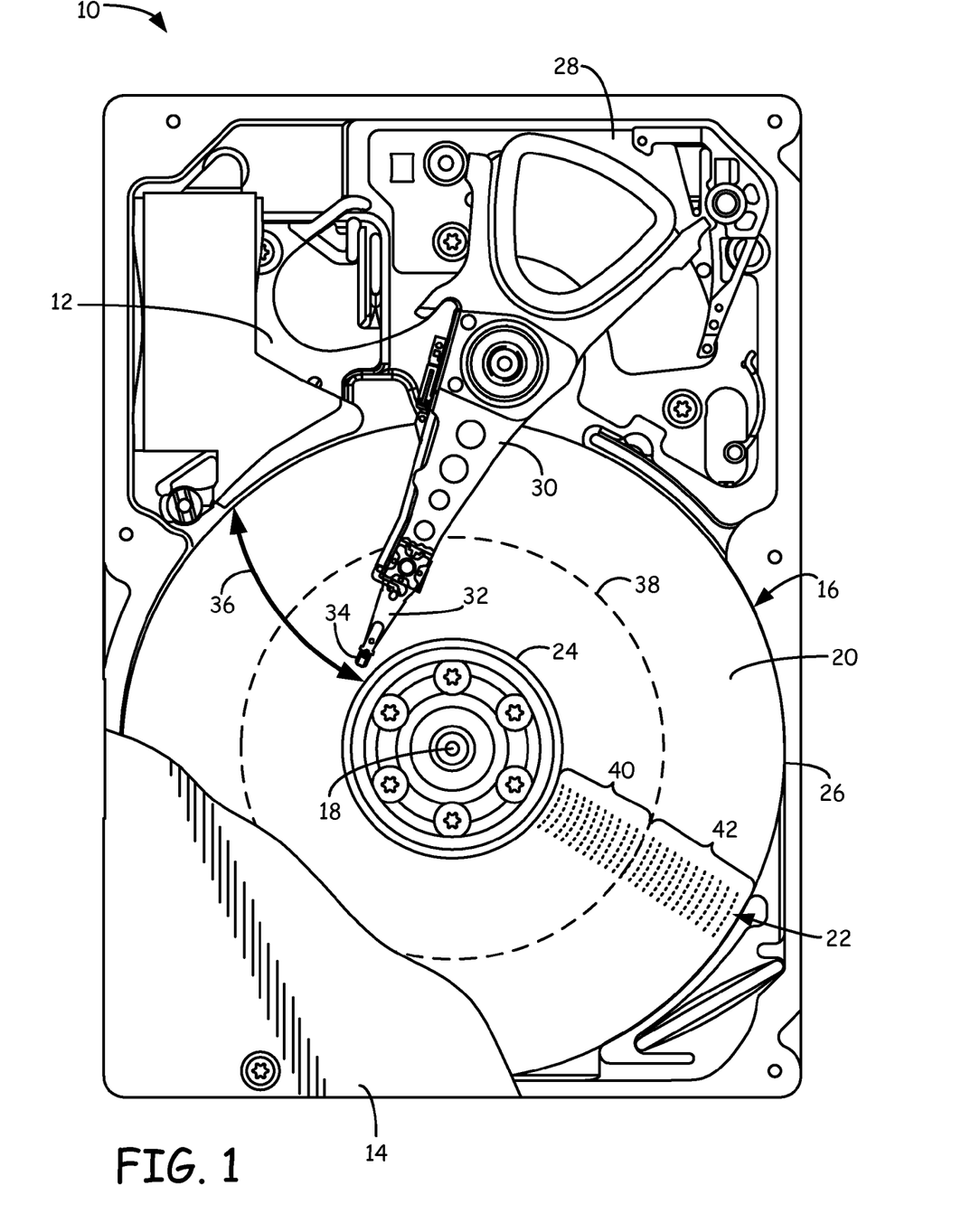
FIG. 1 is a plan view of a disc drive having a storage disc that contains a data zone group boundary.

FIG. 1 is a plan view of disc drive 10, which is an exemplary data storage device (e.g., a hard disc drive) for storing and transferring digital data with a host device (not shown).

As discussed below, disc drive 10 includes a dual-writer transducing head for storing data on a recording medium, where each of the dual writers is desirably operated within a determined data zone group on the recording medium to increase storage capacity. As shown, the components of disc drive 10 are retained between base 12 and top cover 14 (shown in partial cut-away), which mate to form a sealed housing.

Disc drive 10 also includes storage disc 16 and spindle motor 18, where spindle motor 18 rotates storage disc 16 in a rotational direction during operation. Storage disc 16 includes surface 20, which is a recordable surface of storage disc 16, and includes a plurality of concentric data tracks (not shown) for storing data. The data tracks are grouped into concentric data zones 22, where surface 20 may include any suitable number of data zones 22 (e.g., 15-30 data zones). Surface 20 is located between inner diameter (ID) edge 24 and outer diameter (OD) edge 26, where ID edge 24 is the circumferentially innermost edge of surface 20 and OD edge 26 is the circumferentially outermost edge of surface 20. Storage disc 16 may also include small unwritable regions adjacent to ID edge 24 and/or OD edge 26 (e.g., transition and landing zones).

Disc drive 10 further includes actuation motor 28 (e.g., a voice coil motor), actuator arm 30, suspension assembly 32, and slider 34, where slider 34 carries a dual-writer transducing head (not shown in FIG. 1). Slider 34 is supported by suspension assembly 32, which in turn is supported by actuator arm 30. Actuation motor 28 is configured to pivot actuator arm 30 about an axis in order to sweep suspension assembly 32 and slider 34 in an arc across surface 20 (represented by arrow 36), where slider 34 desirably floats above surface 20 on a cushion or air. An additional microactuation system (not shown) may also be used to produce precise, small-scale movements of suspension assembly 32 and slider 34. As slider 34 moves across surface 20, the transducing head carried by slider 34 may be positioned relative to selected data tracks located on surface 20. This allows the transducing head to write data to, and read from, the data tracks on surface 20 during operation.

As discussed above, the transducing head of slider 40 includes two writers, where the two writers are desirably configured to reduce the effects of skew angles between the transducing head and the data tracks during write operations on surface 20. Examples of suitable devices having a plurality of writers for disc drive 10 include those disclosed in U.S. Patent Application Publication No. 2009/0251821, entitled "Dedicated ID-OD Writer With Beveled Pole Tips And Method Of Manufacture". In situations in which the two writers exhibit substantially the same writing capabilities, each writer is desirably configured to write data on about one one-half of the overall areal density of surface 20. However, transducing heads that are mass produced typically exhibit performance variations, which can affect the writing capabilities of each of the writers. As a result, the configuration that provides the greatest areal-density writing capabilities may not necessarily be one where the load distribution is shared evenly between the two writers.

Accordingly, to increase the storage capacity of disc drive 10, the load distribution between the writers may be set to accommodate for any performance variations between the writers. This involves determining a location along the radius of surface 30 to position boundary 38. Boundary 38 is a data zone group boundary that divides the data zones 22 of surface 20 into inner group 40 and outer group 42 based on measured writing capabilities of each of the writers. For example, the location of boundary 38 may be based on the track density capabilities, the linear density capabilities, and/or the areal density capabilities (i.e., a product of the track and linear density capabilities) of the writers. As used herein, the term "measured writing capability" refers to the writing capability of a writer based on one or more actual measurements between the writer and the storage media.

Inner group 40 is a first group of data zones 22 located between ID edge 24 and boundary 38, and outer group 42 is a second group of data zones 22 located between boundary 38 and OD edge 26. As discussed below, boundary 38 functions as a transition point for selectively operating the writers of the transducing head, where one of the writers is dedicated to writing in data zones 22 located in inner group 40, and the other writer is dedicated to writing in data zones 22 located in outer group 42. This arrangement sets the load distribution between the writers to accommodate for performance variations between the writers, thereby increasing the storage capacity of disc drive 10.

In alternative embodiments, disc drive 10 may include a stack of co-rotating storage discs 16 with additional actuator arms 36, suspension assemblies 38 and sliders 40 carrying transducing heads for reading and writing at top and bottom surfaces of each storage disc 16 in the stack. In this embodiment, one or more of the co-rotating storage discs 16 may include data zone groups identified by data zone group boundaries for use with transducers having multiple writers.

Figure 2:
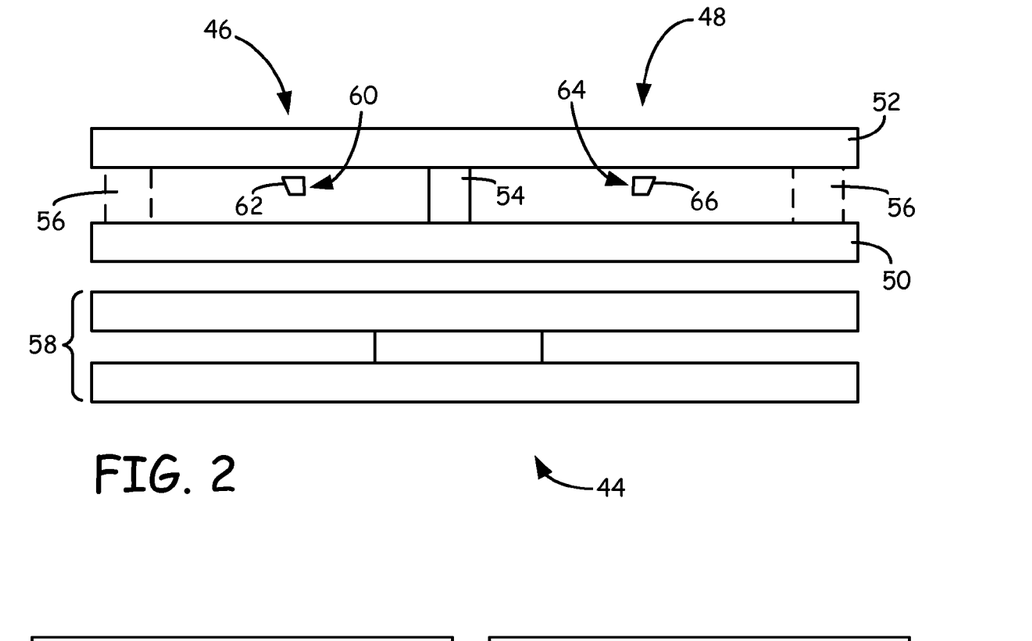
FIG. 2 is a plan view of a dual-writer transducing head of the disc drive viewed from an air bearing surface.

FIG. 2 is a plan view of transducing head 44 of slider 40 (shown in FIG. 1) viewed from an ABS at surface 20, which further illustrates the dual-writer embodiment. As shown in FIG. 2, transducing head 44 includes inner writer 46 for dedicated writing at inner group 40 (shown in FIG. 1), outer writer 48 for dedicated writing at outer group 42 (shown in FIG. 1), first return pole 50, second return pole (or front shield) 52, shield 54, optional side shields 56, and reader assembly 58. In an alternative embodiment, the arrangement of inner writer 46 and outer writer 48 may be reciprocated so long as transducing head 44 includes a first writer configured for dedicated writing in a first data zone group and a second writer configured for dedicated writing in a second data zone group, where the first and second data zone groups are separated by a data zone group boundary (e.g., boundary 38, shown in FIG. 1).

Inner writer 46 includes a main pole that defines pole tip 60, which desirably has an asymmetrical, trapezoidal geometry along the ABS. This defines beveled wall 62, which is configured at a non-zero wall angle (e.g., 7.5°, 11°, and 15° wall angles), and which may be positioned at a radially outer location in inner writer 46 to help reduce overwriting due to skew angles during operation. For example, beveled wall 62 may face ID edge 24 of storage disc 16 (shown in FIG. 1) to reduce skew angles adjacent to ID edge 24. Similarly, outer writer 48 includes a main pole that defines pole tip 64, which desirably has an asymmetrical, trapezoidal geometry along the ABS. This defines beveled wall 66, which is configured at a non-zero wall angle (e.g., 7.5°, 11°, and 15° wall angles), and which may be positioned at a radially outer location in outer writer 48 to help reduce overwriting due to skew angles during operation. For example, beveled wall 66 may face OD edge 26 of storage disc 16 (shown in FIG. 1) to reduce skew angles adjacent to OD edge 26. In alternative embodiments, transducing head 44 may include three or more writers.

The use of two or more writers (e.g., inner writer 46 and outer writer 48), each dedicated for use within a selected region of surface 20, allows each pole tip (e.g., pole tips 60 and 64) to have only a single beveled wall. As discussed in U.S. Patent Application Publication No. 2009/0251821, this allows pole tips 60 and 64 to exhibit more-rectangular geometries compared to double-bevel pole tip configurations, thereby increasing the magnetic flux for data writing. Furthermore, inner writer 46 is desirably oriented such that beveled wall 62 faces ID edge 24 of storage disc 16, and outer writer 48 is desirably oriented such that beveled wall 66 faces OD edge 26 of storage disc 16. With this arrangement, during operation, inner writer 46 may write to tracks within data zones 22 of inner group 40 to reduce skew angle effects adjacent to ID edge 24. As transducing head 44 moves across boundary 38 from inner group 40 to outer group 42, inner writer 46 stops writing, and outer writer 48 writes to data tracks within data zones 22 of outer group 42 to reduce skew angle effects adjacent to OD edge 26. This selective operation of inner writer 46 and outer writer 48 reduces the skew angles between the given writers and the data tracks over the entire surface of storage disc 16. Furthermore, the location of boundary 38 along the radius of surface 20 desirably sets the load distribution between inner writer 46 and outer writer 48 to accommodate for performance variations between inner writer 46 and outer writer 48. As discussed above, this increases the storage capacity of disc drive 10.

Figure 3:
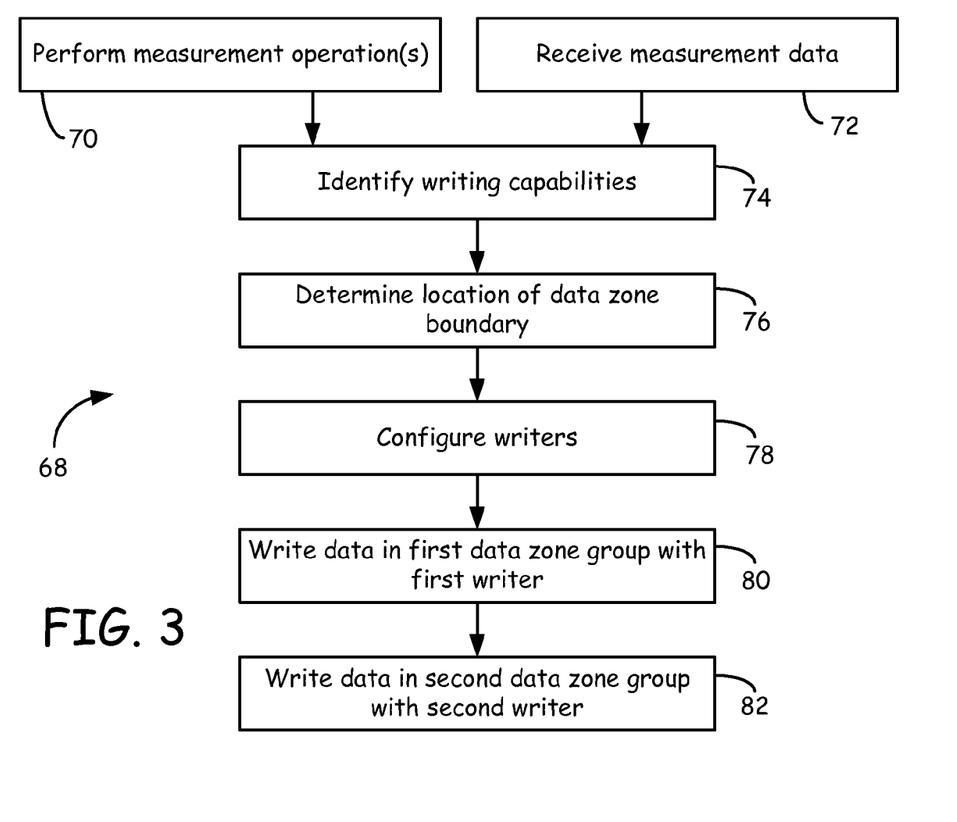
FIG. 3 is a flow diagram of a method for setting load distributions between multiple writers.

FIG. 3 is a flow diagram of method 68, which is an exemplary method for setting load distributions between a plurality of writers to accommodate for performance variations between the writers. Method 68 includes steps 70-82, and may initially involve performing at least one measurement operation between the plurality of writers and the storage medium (step 70). For example, at least one measurement operation may be performed between inner writer 46 and storage disc 16, and at least one measurement operation may be performed between outer writer 48 and storage disc 16. Examples of suitable measurement operations include track density capability measurements, linear density capability measurements, areal density capability measurements, and combinations thereof The measurements may be performed at each data zone along the recordable surface of the storage medium (e.g., data zones 22), or alternatively, at one or more selected data zones. As discussed below, the number of measurements may be reduced based on logical assumptions of the performance variations between the writers.

In an alternative embodiment, measurement data of the writers may be measured and received from an external source (step 72). For example, an external manufacturer or supplier may perform at least one measurement operation on the writers prior to shipping the disc drive (e.g., during certification testing). The results of the performed measurement operation(s) may then be received to identify the writing capabilities of the writers. In additional alternative embodiments, at least one measurement operation may be performed on the writers (pursuant to step 70) and additional measurement data for the writers may be received from an external source (pursuant to step 72).

After the measurements of the writers are performed and/or received, the resulting data is compared to identify the writing capabilities of each of the writers (step 74). For example, track density profiles along the radius of the recording medium surface may be compared to identify an intersection point to transition between the writers. This intersection point is suitable for setting the load distribution between the writers.

The location of at least one data zone group boundary is then determined based on the identified writing capabilities (step 76). In one embodiment, the data zone group boundary(ies) is desirably determined at a location along the radius of the storage medium surface that accommodates for any performance variations between the writers. In embodiments in which the transducing head includes two writers (e.g., inner writer 46 and outer writer 48), a single data zone group boundary may be used to divide the data zones of the storage medium surface into two data zone groups. Thus, continuing with the above example, pursuant to step 76 of method 68, the location of boundary 38 may be determined based on the identified writing capabilities of inner writer 46 and outer writer 48. This location divides data zones 22 into inner group 40 and outer group 42. Alternatively, in embodiments in which the transducing head includes three or more writers, data zone group boundaries are desirably used to provide a data zone group for each writer.

The above-discussed measurement data and determined location(s) of the one or more data zone group boundaries may be stored on a variety of media, such as volatile and non-volatile media, and removable and non-removable media. The stored information may also be implemented in any method or technology for storage of information, such as computer readable instructions, data structures, program modules, and the like. For example, the determined location(s) of the one or more data zone group boundaries and respective implementation may be encoded in firmware for operating the data storage device.

After the data zone group boundary(ies) is determined, the writers of the transducing head are configured to selectively operate in their respective data zone groups (step 78). For example, inner writer 46 is configured to write data to tracks within data zones 22 located in inner group 40, and outer writer 48 is configured to write data to tracks within data zones 22 located in outer group 42. The configuration of the writers may be performed in a variety of manners, such as assigning parameters to at least one controller (e.g., disc controllers) used to operate the writers, where the assigned parameters are based at least in part on the location of the boundary, and where the location of boundary 38 desirably functions as the transition point to selectively operate inner writer 46 and outer writer 48 between inner group 40 and outer writer 48.

During a subsequent write operation, a first writer of the multiple writers (e.g., inner writer 46) is operated to write data in a first data zone group (e.g., inner group 40) (step 80). When the transducing head crosses the data zone group boundary (e.g., boundary 38), the first writer stops writing and a second writer of the multiple writers (e.g., outer writer 48) is operated to write data in a second data zone group (e.g., inner group 42) located on the opposing side of the data zone group boundary (step 82). The selective operation of the first and second writers may switch back and forth every time the transducing head crosses the data zone group boundary. The allows appropriate writer to be used to reduce the effects of skew angles between the storage medium surface and the writers.

Figure 4A:
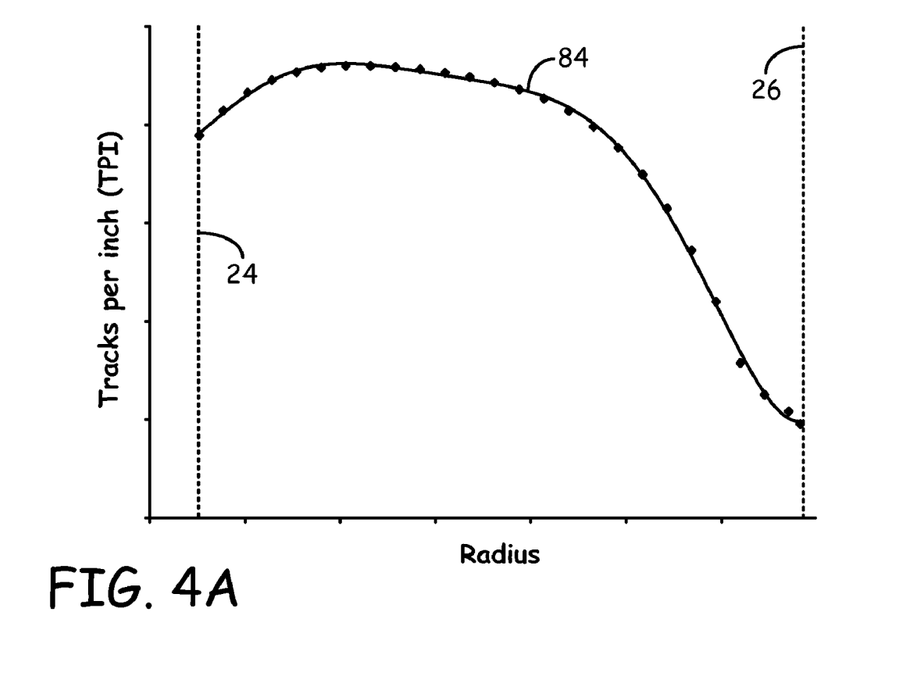
FIGS. 4A-4D are graphical representations of track density profiles versus disc surface radius for a transducing head having two writers that exhibit substantially the same writing capabilities.
Figure 4B:
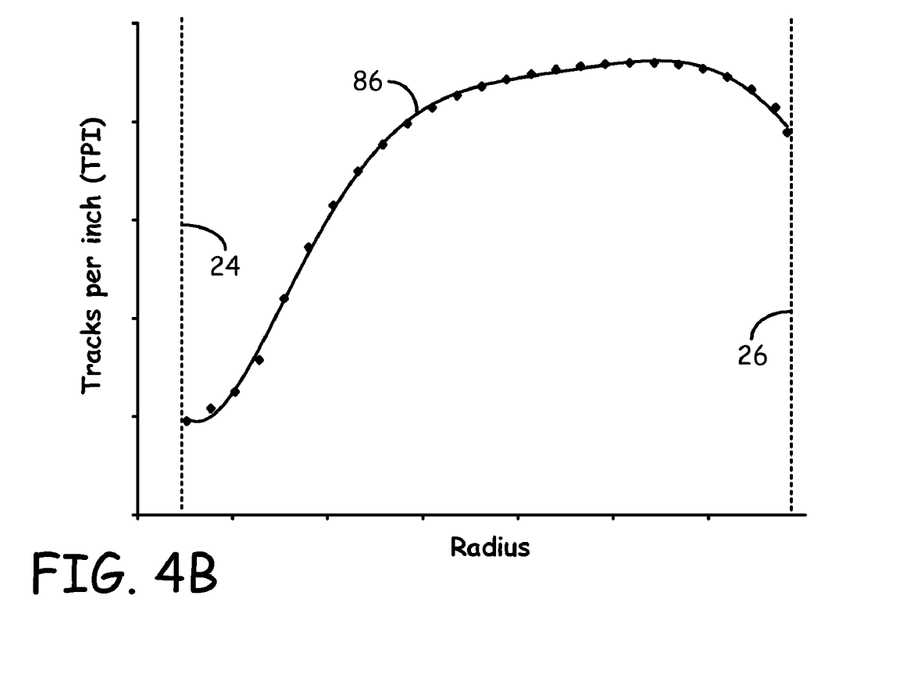

FIGS. 4A-4D are graphical representations of track density profiles versus disc surface radius for inner writer 46 and outer writer 48 (shown in FIG. 2), which illustrate the application of method 68 (shown in FIG. 3) for an exemplary situation in which inner writer 46 and outer writer 48 exhibit substantially the same writing capabilities. FIGS. 4A and 4B respectively illustrate the writing capacities of inner writer 46 and outer writer 48 based on track density measurements performed at data zones 22 between ID edge 24 and OD edge 26, pursuant to step 70 of method 68.

As shown in FIG. 4A, the track density profile of inner writer 46 (referred to as profile 84) shows a decrease in tracks-per-inch toward OD edge 26. This decrease is due to the skew angle between inner writer 46 and the data tracks at the outer portion of surface 20. As discussed above, inner writer 46 only includes a beveled wall (i.e., beveled wall 62)

facing ID edge 24. As a result, the imposed skew angle at OD edge 26 reduces the writing capabilities of inner writer 46 at the outer portion of surface 20.

As shown in FIG. 4B, the track density profile of outer writer 48 (referred to as profile 86) shows a decrease in tracks-per-inch toward ID edge 24. This decrease is correspondingly due to the skew angle between outer writer 48 and the data tracks at the inner portion of surface 20. As discussed above, outer writer 48 only includes a beveled wall (i.e., beveled wall 66) facing OD edge 26. As a result, the imposed skew angle at ID edge 24 reduces the writing capabilities of outer writer 48 at the inner portion of surface 20.

Figure 4C:
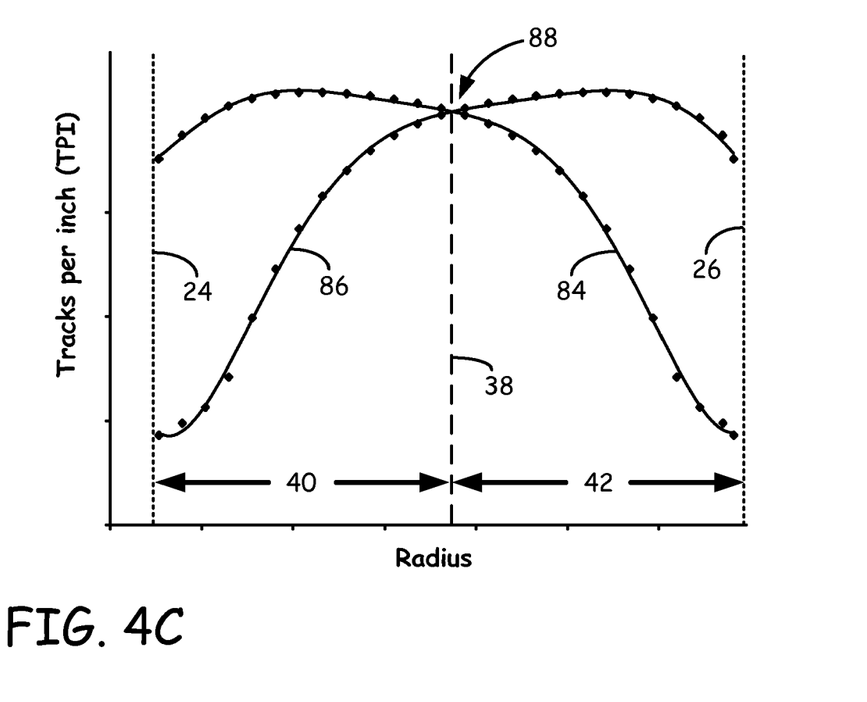

FIG. 4C provides a combined overlay of profiles 84 and 86, which identifies the relative writing capabilities of inner writer 46 and outer writer 48 (pursuant to step 74 of method 68). As shown, profiles 84 and 86 cross at intersection point 88, where profile 84 provides higher track densities along the radius of surface 20 between ID edge 24 and intersection point 88, and profile 86 provides higher track densities along the radius of surface 20 between intersection point 88 and OD edge 26. As such, the location along the radius of surface 20 at intersection point 88 is a suitable location for the data zone group boundary (i.e., boundary 38) to be positioned (pursuant to step 76 of method 68). The location of boundary 38 divides the data zones 22 of surface 20 into inner group 40 and outer group 42.

Figure 4D:
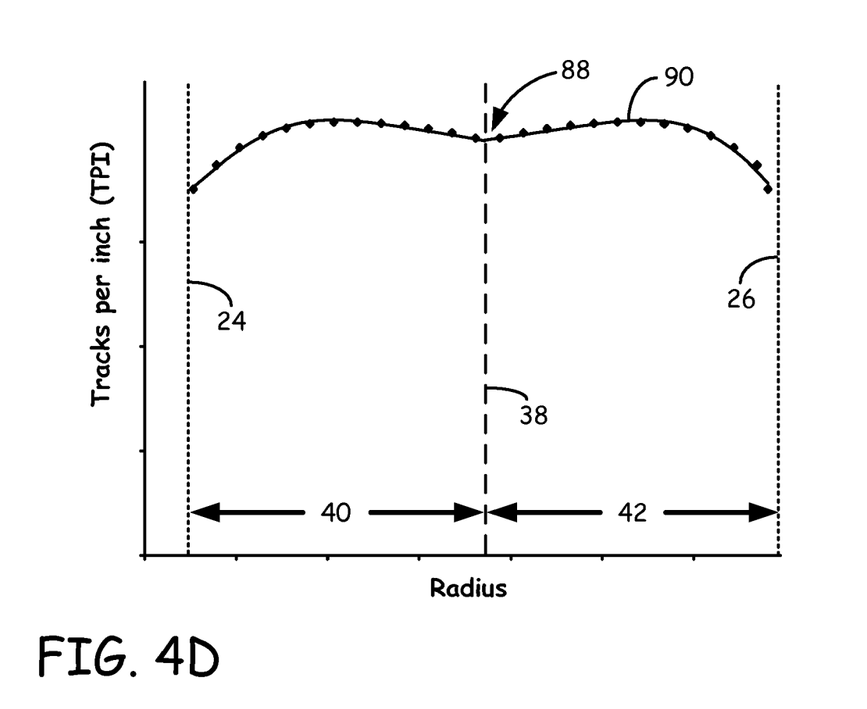

FIG. 4D is the resulting track density profile 90 that is obtained with the placement of boundary 38. As shown, the placement of boundary 38 at intersection point 88 substantially maximizes the overall storage capacity for storage disc 16. Placement of boundary 38 at any other location along the radius of surface 20 would result in a lower overall storage capacity for storage disc 16. It is noted that because inner writer 46 and outer writer 48 have substantially the same writing capacities in the example shown in FIGS. 4A-4D, boundary 38 is located substantially at the nominal setpoint along the radius of surface 20 between ID edge 24 and OD edge 26, where the nominal setpoint is a point along the radius of surface 20 at which the writers (e.g., inner writer 46 and outer writer 48) each have substantially zero skew angle. As a result, the set load distribution between inner writer 46 and outer writer 48 is substantially even (i.e., inner group 40 and outer group 42 include the same number of data tracks).

Figure 5A:
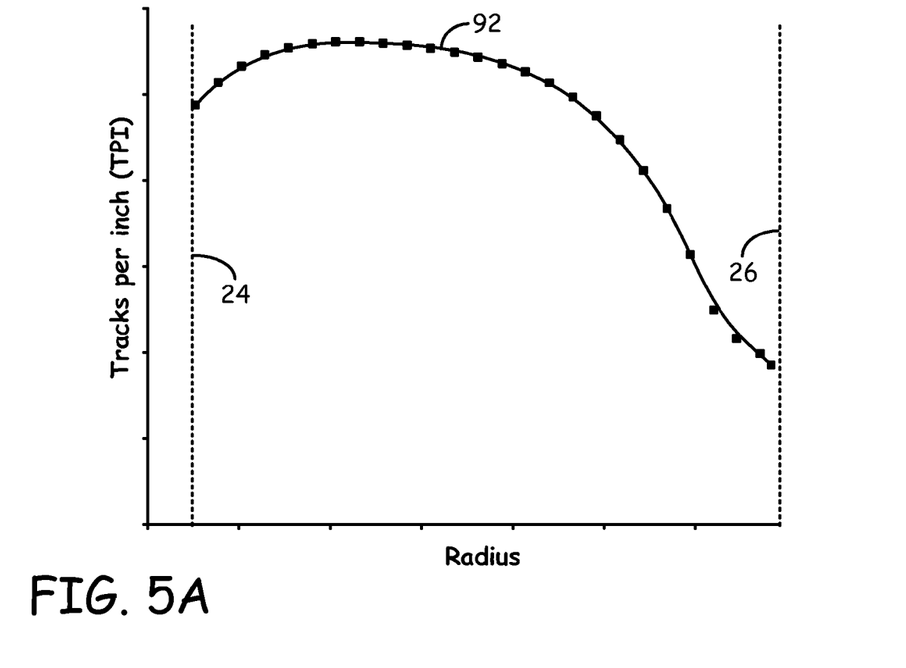
FIGS. 5A-5D are graphical representations of track density profiles versus disc surface radius for a transducing head having two writers that exhibit different writing capabilities.
Figure 5B:
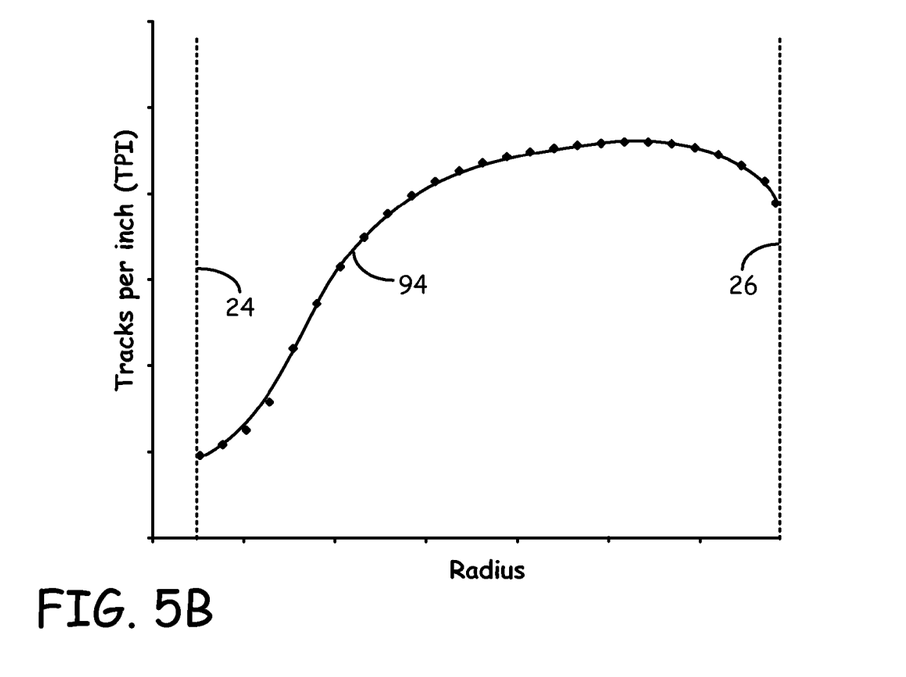

FIGS. 5A-5D are graphical representations of track density profiles versus disc surface radius for inner writer 46 and outer writer 48 (shown in FIG. 2), which illustrate the application of method 68 (shown in FIG. 3) for a situation in which inner writer 46 and outer writer 48 exhibit different linear and track density capabilities. FIGS. 5A and 5B respectively illustrate the writing capacities of inner writer 46 and outer writer 48 based on track density measurements performed at data zones 22 between ID edge 24 and OD edge 26, pursuant to step 70 of method 68. As shown in FIG. 5A, the track density profile of inner writer 46 (referred to as profile 92) shows a decrease in tracks-per-inch toward OD edge 26. Similarly, as shown in FIG. 5B the track density profile of outer writer 48 (referred to as profile 94) shows a decrease in tracks-per-inch toward ID edge 24.

Figure 5C:
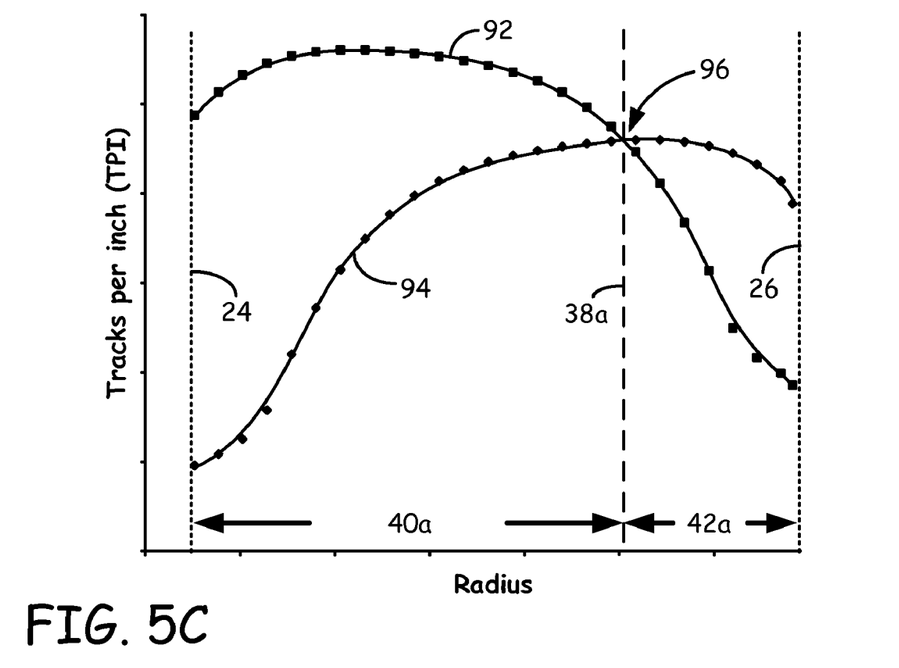

FIG. 5C provides a combined overlay of profiles 92 and 94, which identifies the relative writing capabilities of inner writer 46 and outer writer 48 (pursuant to step 74 of method 68). As shown, profiles 92 and 94 cross at intersection point 96, where profile 92 provides higher track densities along the radius of surface 20 between ID edge 24 and intersection point 96, and profile 94 provides higher track densities along the radius of surface 20 between intersection point 96 and OD edge 26. As such, the location along the radius of surface 20 at intersection point 96 is a suitable location for the data zone group boundary (referred to as boundary 38a) to be positioned (pursuant to step 76 of method 68). However, in comparison to profiles 84 and 86 (shown in FIG. 3C), profiles 92 and 94 show that inner writer 46 is capable of providing a higher track density relative to outer writer 48 along a substantial number of data tracks 22 beyond the nominal setpoint between ID edge 24 and OD edge 26. As a result, the location of boundary 38a divides the data zones of surface 20 into inner group 40a and outer group 42a, where inner group 40a includes a greater number of data zones compared to outer group 40b. This corresponds to the higher writing capacity of inner writer 46 compared to outer writer 48.

Figure 5D:
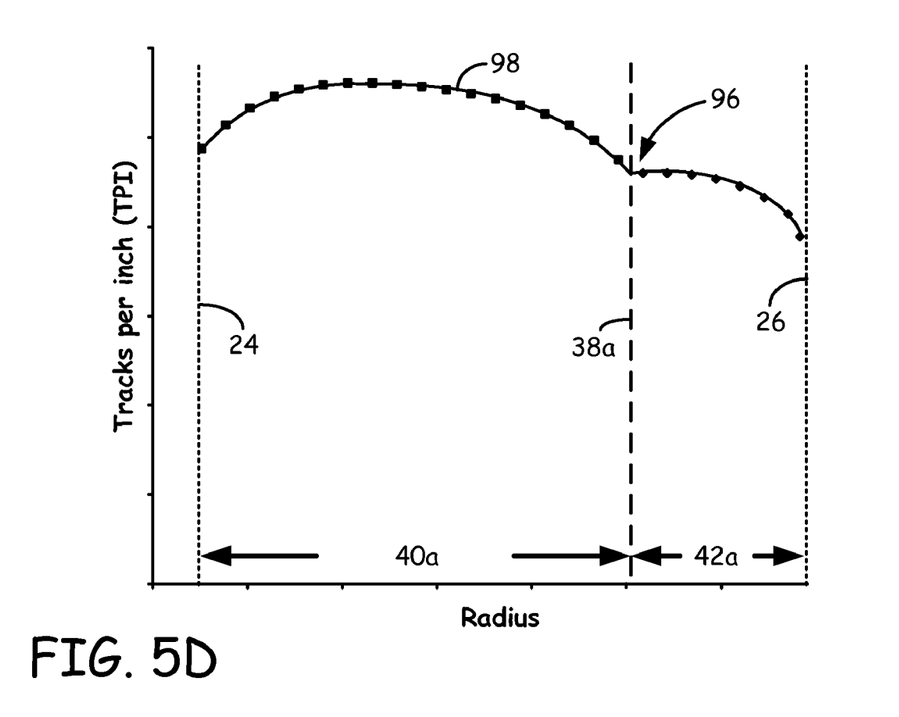

FIG. 5D is the resulting track density profile 98 that is obtained with the placement of boundary 38a. As shown, the placement of boundary 38a at intersection point 98 substantially maximizes the overall storage capacity for storage disc 16. Placement of boundary 38a at any other location along the radius of surface 20 would result in a lower overall storage capacity for storage disc 16. Accordingly, the set load distribution between inner writer 46 and outer writer 48 is disproportionate to accommodate for the performance variations between inner writer 46 and outer writer 48.

Figure 6:
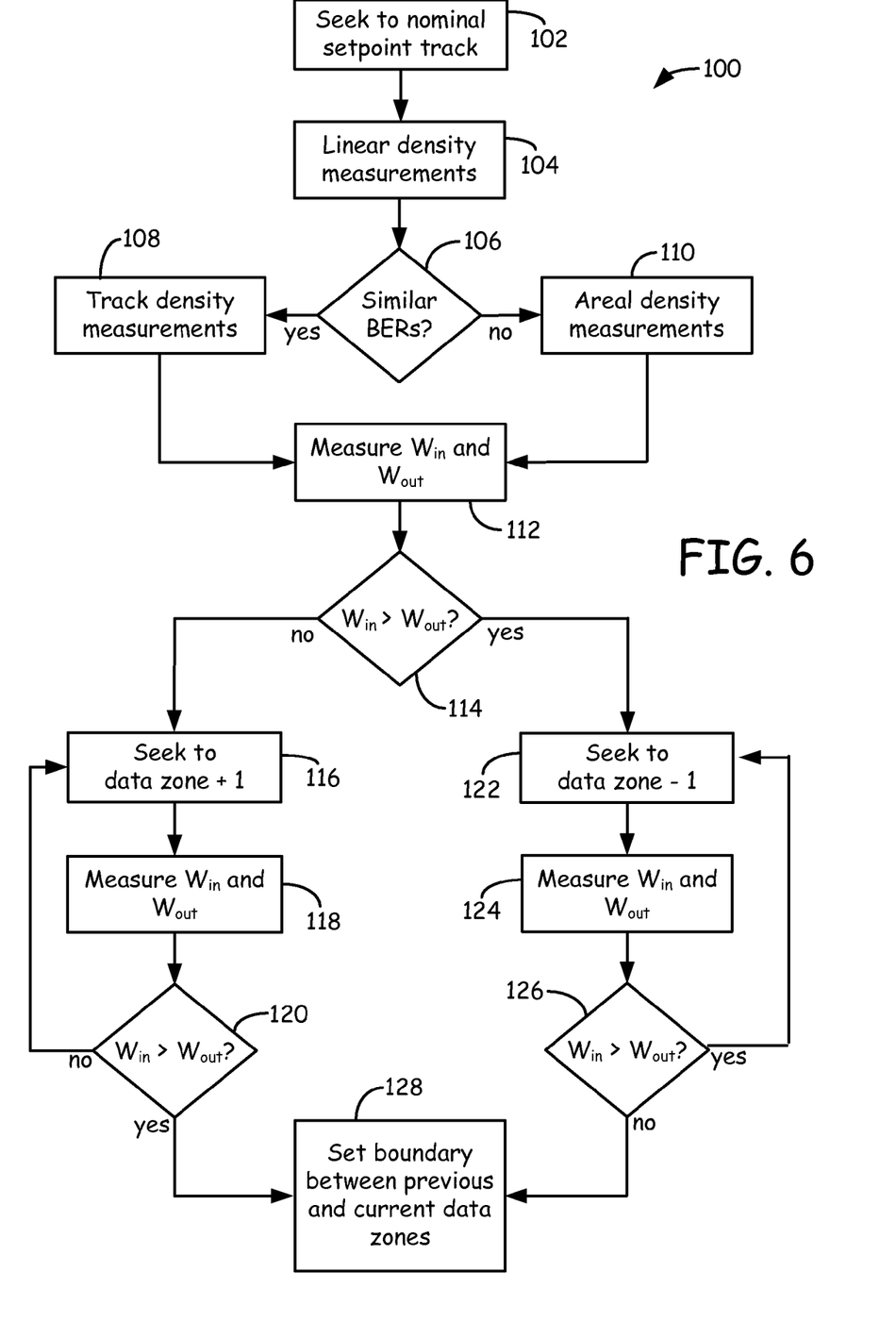
FIG. 6 is a flow diagram of a method for measuring writing capabilities and identifying a location of a data zone group boundary with a reduced number of measurements.

FIG. 6 is a flow diagram of method 100, which is an exemplary method for measuring writing capabilities and identifying a location of a data zone group boundary, pursuant to steps 70, 74, and 76 of method 68 (shown in FIG. 3). The above-discussed measurement data and determined location(s) of the one or more data zone group boundaries may be stored on a variety of storage media, such as volatile and non-volatile media, and removable and non-removable media. The stored information may also be implemented in any method or technology for storage of information, such as computer readable instructions, data structures, program modules, and the like. For example, the determined location(s) of the one or more data zone group boundaries and respective implementation may be encoded in firmware for operating the data storage device.

As discussed above, the number of measurements may be reduced based on logical assumptions of the performance variations between the writers. For example, in one embodiment, measurements may be limited to data zones adjacent to the nominal setpoint location between ID edge 24 and OD edge 26, where the initial measurement is desirably made at a data track located at, or close to, the nominal setpoint location. This embodiment operates under the assumption that manufacturing variances between writers typically position the data zone group boundary (e.g., boundaries 38 and 38a) within a few data zones from the radius nominal setpoint of the storage medium surface. Examples of suitable measurement ranges include about ten data zones or less in either direction from the radius nominal setpoint location, with particularly suitable measurement ranges include about five data zones or less in either direction from the radius nominal setpoint location.

Additionally, the measurement operations may also initially involve measuring the linear density capabilities for each of the writers at the radius nominal setpoint location. The nominal setpoint location is initially chosen in this embodiment because both writers have zero skew angles relative to the data tracks at this point, thereby allowing a fair comparison between the writers to be made based on the linear density capabilities. Since the areal density is the product of the linear density and the track density, if both writers exhibit similar liner density capabilities at the radius nominal setpoint location, then subsequent measurements need only include track density capabilities. This reduces the time required to perform the measurement operations. Examples of suitable bit error rate (BER) differences to preclude the need to perform full measurements of areal density capabilities include differences less than about 0.5 order, with particularly suitable bit error rate differences including differences less than about 0.2 order.

Method 100 illustrates a technique that incorporates each of these above-discussed embodiments, and may be implemented in a variety of manners. For example, method 100 may be computer-implemented instructions stored on a variety of media (e.g., volatile/non-volatile media and removable/non-removable media), and, when executed, perform one or more of steps 102-128. Pursuant to steps 102-128, method 100 may initially involve seeking to the data track located closest to the nominal setpoint location along the radius of the storage medium surface (step 102). The linear density capabilities for the writers (referred to as inner writer $W_{in}$ and outer writer $W_{out}$ in the current example) are then measured (step 104) and compared (step 106). If writers $W_{in}$ and $W_{out}$ have similar linear density capabilities, then track density measurements may be performed (pursuant to step 108) instead of full areal density measurements (pursuant to step 110). Examples of suitable thresholds for determining whether writers $W_{in}$ and $W_{out}$ have similar linear density capabilities include the above-discussed BER differences (e.g., less than about 0.5 order, or less than about 0.2 order).

In the current example, it is assumed that writers $W_{in}$ and $W_{out}$ have similar linear density capabilities. As such, the subsequent measurements may be limited to track density measurements (step 108), which require substantially less time to perform compared to full areal density measurements. Accordingly, the track density capabilities for writers $W_{in}$ and $W_{out}$ are measured at the current data zone (i.e., the data zone located at, or closest to, the nominal setpoint along the radius of the storage medium surface) (step 112).

The measured track density capabilities are then compared (step 114). If the track density capability of inner writer $W_{in}$ is not greater than the track density capability of outer writer $W_{out}$, then writers $W_{in}$ and $W_{out}$ seek to the next data zone toward the inner-diameter edge of the storage medium (i.e., data zone+1) (step 116). In the shown embodiment, method 100 relies on the standard data zone numbering system in which data zone "1" is the outermost data zone located adjacent to the outer edge of the storage medium, and the data zone numbering increases toward the inner edge of the storage medium. Alternatively, method 100 may be performed in a similar manner with a reciprocated data zone numbering system.

The track density capabilities for the writers $W_{in}$ and $W_{out}$ are then measured at the current data zone (i.e., data zone+1) (step 118), and the measured track density capabilities are compared (step 120). If the currently measured track density capability of inner writer $W_{in}$ is not greater than the track density capability of outer writer $W_{out}$ (step 120), then steps 116, 118, and 120 are repeated until a data zone in which the measured track density capability of inner writer $W_{in}$ is greater than the track density capability of outer writer $W_{out}$ is found. This identifies the intersection point of the track density profiles of writers $W_{in}$ and $W_{out}$. The data zone group boundary is then set at a location along the radius of the storage medium surface that is located between the previous data zone and the current data zone (step 128).

Alternatively, referring back to step 114, if the track density capability of inner writer $W_{in}$ is greater than the track density capability of outer writer $W_{out}$, then writers $W_{in}$ and $W_{out}$ seek to the next data zone toward the outer-diameter edge of the storage medium (i.e., data zone−1) (step 122). The track density capabilities for writers $W_{in}$ and $W_{out}$ are then measured at the current data zone (i.e., data zone−1) (step 122), and the measured track density capabilities are compared (step 124). If the currently measured track density capability of inner writer $W_{in}$ is greater than the track density capability of outer writer $W_{out}$ (step 126), then steps 122, 124, and 126 are repeated until a data zone in which the measured track density capability of inner writer $W_{in}$ is not greater than the track density capability of outer writer $W_{out}$ is found. This identifies the intersection point of the track density profiles of writers $W_{in}$ and $W_{out}$. The data zone group boundary is then set at a location along the radius of the storage medium surface that is located between the previous data zone and the current data zone (step 128).

Referring back to step 106, if writers $W_{in}$ and $W_{out}$ alternatively do not have similar linear density capabilities, then steps 112-128 are desirably performed using areal density measurements in lieu of track density measurements (step 110). Areal density measurements are desirable in this case because the differences in linear density capabilities of writers $W_{in}$ and $W_{out}$ may affect the resulting writing capabilities of writers $W_{in}$ and $W_{out}$. Pursuant to step 128, the data zone group boundary is then set at a location along the radius of the storage medium surface that is located between the previous current data zones in the same manner as discussed above.

As discussed above, method 100 is suitable for reducing the number of measurements required to determine the location of the data zone group boundary. This can substantially reduce the time required to configure the data storage component, particularly when the storage medium surface of the data storage component contains a large number of data zones.

Figure 7:
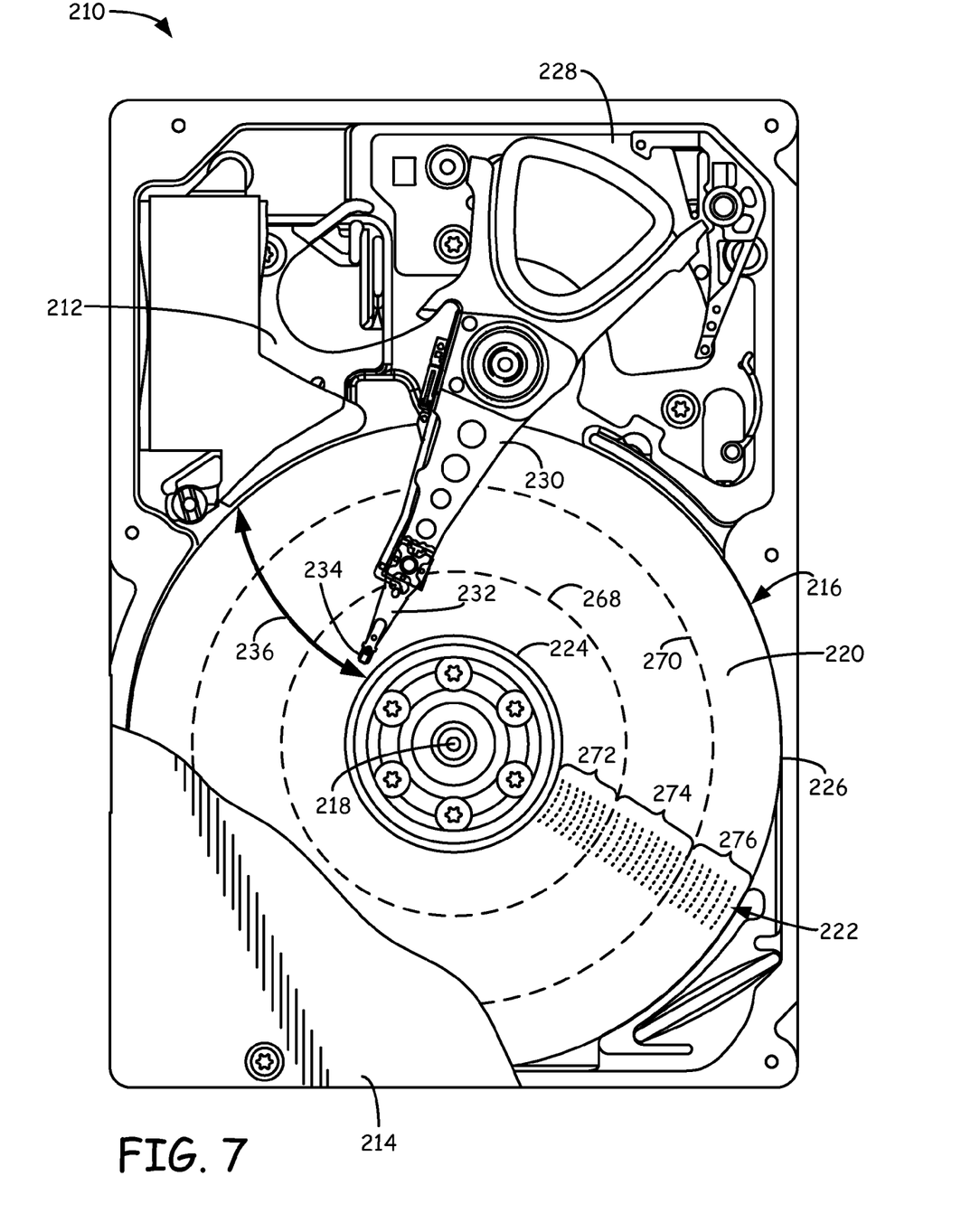
FIG. 7 is a plan view of an alternative disc drive having a storage disc that contains two data zone group boundaries.

FIG. 7 is a plan view of disc drive 210, which is an alternative to disc drive 10 (shown in FIG. 1), where the respective reference labels are increased by "200". In comparison to disc drive 10, disc drive 210 includes a triple-writer transducing head for storing data on storage disc 216. Accordingly, surface 220 of storage disc 216 includes boundaries 268 and 270, which may be determined in the same manner as discussed above for boundary 38 (shown in FIG. 1) using method 68 (shown in FIG. 3) and/or method 100 (shown in FIG. 6). As shown in FIG. 7, boundaries 268 and 270 divide data tracks 222 into inner group 272, middle group 274, and outer group 276, where boundaries 268 and 270 function as transition points for selectively operating the three writers (not shown) in the same manner as discussed above for boundary 38. Accordingly, methods 68 and 100 are suitable for determining the locations of data zone group boundaries for transducing heads having a plurality of writers.

Although the present invention has been described with reference to preferred embodiments, workers skilled in the art will recognize that changes may be made in form and detail without departing from the spirit and scope of the invention.

The invention claimed is:

1. A method comprising:
    performing a linear density measurement on each of a first writer and a second writer at a data track that is located substantially at a nominal setpoint location along a radius of a storage medium surface;
    identifying a first data zone of the storage medium surface in which a measured writing capability of the first writer is greater than a measured writing capability of the second writer;
    identifying a second data zone of the storage medium surface that is adjacent to the first data zone, and in which a measured writing capability of the first writer is less than a measured writing capability of the second writer, wherein the measured writing capabilities of the first writer and the second writer are based on track densities when a difference between the linear density measurements is less than a predetermined value; and setting a boundary at a location along the storage medium surface that is between the first data zone and the second data zone, wherein the boundary functions as a transition point for selectively operating the first writer and the second writer.

2. The method of claim 1, wherein the boundary is set at a non-nominal setpoint along a radius of the storage medium surface.

3. The method of claim 1, and further comprising:
configuring the first writer to write within a first data zone group on the storage medium surface that is located on a first side of the boundary; and
configuring the second writer to write within a second data zone group on the storage medium surface that is located on an opposing side of the boundary from the first side.

4. The method of claim 3, wherein configuring the first writer and configuring the second writer comprise assigning parameters to at least one controller used to operate the first writer and the second writer, the assigned parameters being based at least in part on the determined location of the set boundary.

5. The method of claim 1, wherein the boundary is a first boundary, and wherein the method further comprises setting a second boundary along the storage medium surface, wherein the second boundary functions as a transition point for selectively operating the second writer and a third writer.

6. The method of claim 1, wherein the storage medium surface comprises a plurality of data zones, and wherein the boundary divides the plurality of data zones into at least a first data zone group and a second data zone group, the first writer being selectively operated to write data in the first data zone group and the second writer being selectively operated to write data in the second data zone group.

7. A method comprising:
performing at least one measurement operation between a storage medium and a plurality of writers to identify writing capabilities of at least a first writer and a second writer of the plurality of writers; and
identifying a first data zone in which the writing capability of the first writer is greater than the writing capability of the second writer;
identifying a second data zone that is adjacent to the first data zone, and in which a writing capability of the first writer is less than a writing capability of the second writer; and
setting a boundary at a location along a surface of the storage medium that is between the first data zone and the second data zone, the boundary dividing data zones of the storage medium into at least a first data zone group writable with the first writer and a second data zone group writable with the second writer.

8. The method of claim 7, wherein the at least one measurement operation is selected from the group consisting of track density capability measurements, a linear density capability measurements, areal density capability measurements, and combinations thereof.

9. The method of claim 7, wherein the set location of the boundary is a non-nominal setpoint location along a radius of the storage medium surface.

10. The method of claim 7, wherein the boundary is a first boundary, and wherein the method further comprises setting a second boundary at a second location along the storage medium surface based on the identified writing capabilities, wherein the second boundary further divides the data zones of the storage medium into a third data zone group writable with a third writer of the plurality of writers.

11. The method of claim 7, wherein performing the at least one measurement operation comprises performing a linear density measurement on each of the first writer and the second writer at a data track that is located substantially at a nominal setpoint location along a radius of the storage medium surface, wherein the writing capabilities of the first writer and the second writer are based on track densities when a difference between the linear density measurements is less than a predetermined value.

12. The method of claim 7, and further comprising assigning parameters to at least one controller used to operate the first writer and the second writer based, the assigned parameters being based at least in part on the location of the set boundary.

13. A data storage device comprising:
a storage medium having a surface comprising a plurality of data zones; and
a boundary located along a radius of the surface that is between a first data zone and a second data zone of the plurality of data zones, wherein a measured writing capability of a first writer of a transducing head is greater than a measured writing capability of a second writer of the transducing head in the first data zone, wherein a measured writing capability of the first writer is less than the a measured writing capability of the second writer in the second data zone, and wherein the boundary divides the plurality of data zones into at least a first data zone group and a second data zone group, and functions as a transition point to selectively operate the first writer and the second writer, wherein the measured writing capabilities of the first writer and the second writer are each based on measured track densities.

14. The data storage device of claim 13, wherein the boundary is located at a non-midpoint location along the radius of the surface.

15. The data storage device of claim 13, wherein the transducing head comprises a first writer configured to write data in the first data zone group and a second writer configured to write data in the second data zone group.

16. The data storage device of claim 15, and further comprising at least one controller used to operate the first writer and the second writer, the at least one controller having assigned parameters based at least in part on the location of the boundary.

17. The data storage device of claim 13, wherein the location of boundary along the radius of the surface increases data storage capacity of the storage medium relative to data storage capacities of the storage medium attainable by setting the boundary at other locations along the radius of the surface.

* * * * *